UNITED STATES PATENT OFFICE.

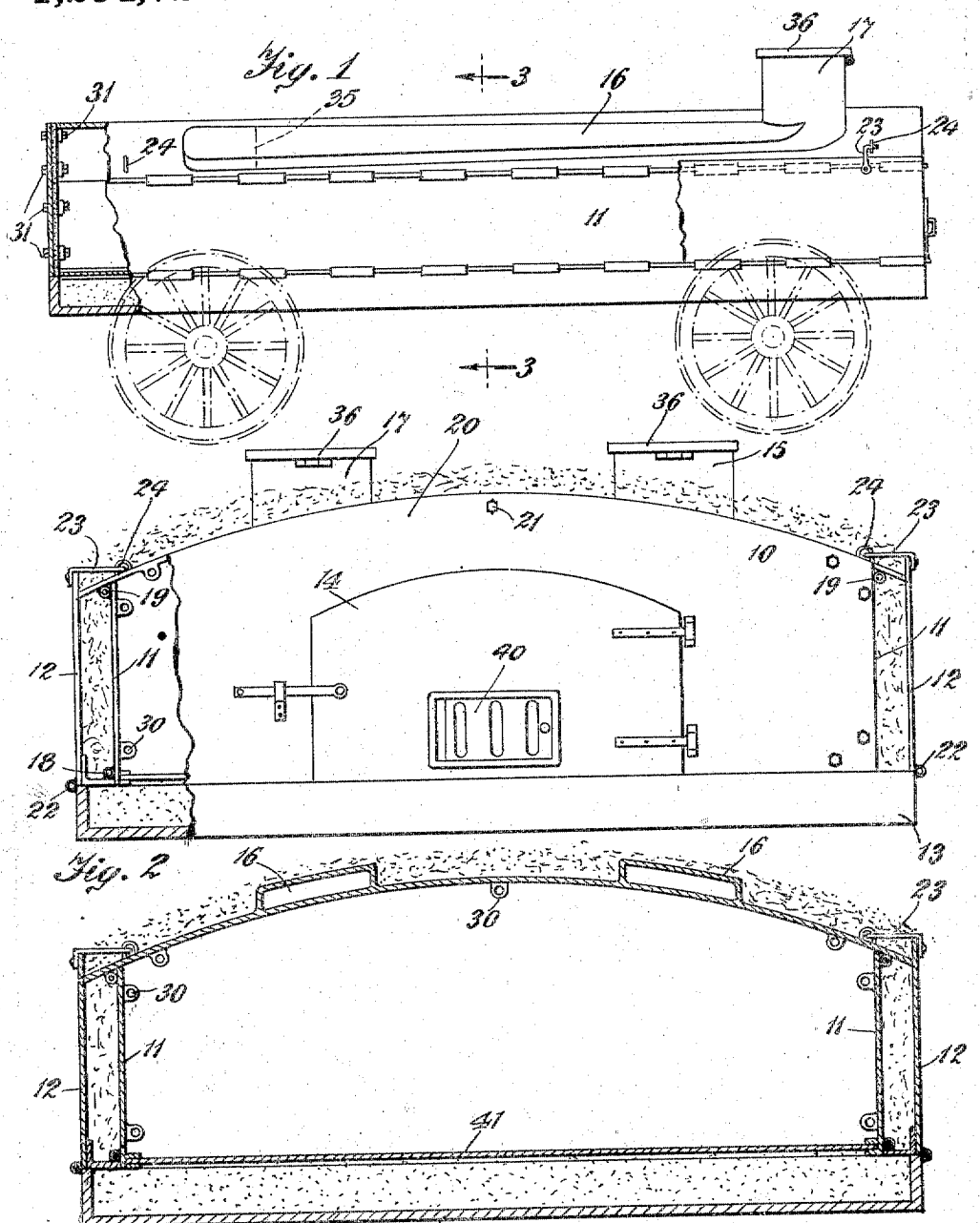

JAMES J. NEEDHAM AND GEORGE SCHEIDELER, OF NEW YORK, N. Y.

OVEN.

1,254,721.     Specification of Letters Patent.     Patented Jan. 29, 1918.

Application filed August 28, 1917. Serial No. 188,557.

*To all whom it may concern:*

Be it known that we, JAMES J. NEEDHAM and GEORGE SCHEIDELER, citizens of the United States, the former residing in New York, county of New York, and State of New York, and the latter residing in New York, county of Queens, and State of New York, have invented certain new and useful Improvements in Ovens, of which the following is a specification.

The present invention is a portable, collapsible oven which is adapted generally for use in the baking of bread or other foods in large quantities for military units or other large bodies of people. The preferred form as shown in the drawing shows an oven which can be taken apart and packed in a small space for transportation. All the parts of the oven are light and easily portable.

Reference is had to the accompanying drawings which represent as an example the preferred embodiment of the idea.

Figure 1 is a sectional elevation of the oven when placed on a vehicle.

Fig. 2 is a front view of the oven in place.

Fig. 3 is a section through the line 3—3 of Fig. 1.

The oven forming the subject of this invention is adapted to be fitted directly upon the ground or may be kept on a moving vehicle if necessary.

In the drawings 10 represents the front wall of the oven which is preferably made of sheet iron covered on both sides with asbestos and with the usual slide draft 40. The rear wall is similarly insulated with asbestos on the inside and outside. 11 represents the side walls of the oven proper. 12 represents plates which are so arranged as to provide the greatest heat containing device practicable. 13 is the base of the oven. 14 is the usual door. 15 and 17 are chimneys and 16 represents the peculiar channels which are an important improvement in my invention.

The oven is constructed by first laying the base 13 and filling it with sand, then covering the filled base with the sliding bottom 41. The sides 11 are secured to the base and top by hinges 18 and 19 respectively. When these are in position the halves of the dome-shaped top 20 are swung over from both sides so that they meet at 21. The inside top walls are provided with angle irons with holes along the center line through which the bolts are run for the purpose of holding the parts of the dome together. The sides 12 are fixed in position by means of hinges 22 and hooks 23 which connect with staples 24. There are a number of these hooks and staples extending along the upper edge of the oven. Having built the oven to this extent the front wall is then put on by means of bolts 31 which are put through the bolt holes 30 in the frame structure. The back is similarly applied by means of bolts. The sides of the oven between the walls 12 and 11 are filled with clay or other heat containing means and clay is similarly piled upon the top and at the back of the oven.

When the oven is thus ready for operation the internal cavity is filled with some firing means and the fire is allowed to burn for a number of hours or whatever time is thought sufficient for the purpose. Then the fire is removed and the food to be cooked is placed in the oven. At the top of the oven are openings 35 on both sides which openings lead into the channel 16 through which the gases flow toward and through the chimney 17. The channel is larger at the end nearest the opening 35 than at the entrance to the chimney for the purpose of providing a good draft. It can be seen that by this construction the heat is distributed along the whole length of the oven. After the fire has been removed from the oven and it is ready for the food which is to be cooked, the tops 36 which are hinged to the chimneys are closed.

It can be seen that the device as shown provides a very light, portable and easily constructed oven, which will do the work for which it is built with the efficiency needed in such work and which is particularly adapted for the needs of the army.

What we claim is:—

1. In an oven the combination of a hollow base, hinged side walls and top, front and rear walls insulated inside and out with asbestos, an opening in the top and a draft chimney running along the top to a chimney opening for the purpose specified.

2. In an oven the combination of a hollow base and a sliding removable floor, hinged side walls and top, front and rear walls insulated inside and out with asbestos, an opening in the top and a draft chimney running along the top to a chimney opening for the purpose specified.

3. In an oven the combination of a hollow base and a sliding removable floor, hinged side walls and top, front and rear walls insulated inside and out with asbestos, an opening in the top and a draft chimney running along the top, the end over the opening being larger than the end entering the chimney opening for the purpose specified.

4. In an oven the combination of a hollow base and a sliding removable floor, hinged side walls and top, front and rear walls insulated inside and out with asbestos, an opening in the top and a draft chimney running along the top, the end over the opening being larger than the end entering the chimney opening, means hinged to the base for allowing the holding of a heat retaining means at the sides and top of the oven.

5. In an oven the combination of a hollow base and a sliding removable floor, hinged side walls and top, front and rear walls insulated inside and out with asbestos, an opening in the top and a draft chimney running along the top, the end over the opening being larger than the end entering the chimney opening, means hinged to the base for allowing the holding of a heat retaining means at the sides and top of the oven, said heat retaining means being clay placed about the sides and on the top of the oven.

6. In a portable, collapsible oven the combination of a base with a sliding oven floor, hinged side walls and top, hinged means for providing an insulation barrier for containing the heat, orifices in the roof of the oven, channels, one end of which cover each orifice, extending along the top of the oven and entering the chimney, a hinged cap on the chimney, front and rear walls of the oven constructed with asbestos insulation on the outside and inside, a door on the front wall with the usual slide draft for the purpose specified.

In testimony whereof we affix our signatures in presence of two witnesses.

JAMES J. NEEDHAM.
GEORGE SCHEIDELER.

Witnesses:
JAMES I. MOORE,
HOWARD S. LA VELLE.